United States Patent
Ge et al.

(10) Patent No.: US 10,535,000 B2
(45) Date of Patent: Jan. 14, 2020

(54) SYSTEM AND METHOD FOR SPEAKER CHANGE DETECTION

(71) Applicant: INTERACTIVE INTELLIGENCE GROUP, INC., Indianapolis, IN (US)

(72) Inventors: Zhenhao Ge, Indianapolis, IN (US); Ananth Nagaraja Iyer, Indianapolis, IN (US); Srinath Cheluvaraja, Indianapolis, IN (US); Aravind Ganapathiraju, Hyderabad (IN)

(*) Notice: Subject to any disclaimer, the term of this patent is extended or adjusted under 35 U.S.C. 154(b) by 47 days.

(21) Appl. No.: 15/727,498

(22) Filed: Oct. 6, 2017

(65) Prior Publication Data
US 2018/0039888 A1 Feb. 8, 2018

Related U.S. Application Data (60) Provisional application No. 62/372,057, filed on Aug. 8, 2016.

(51) Int. Cl.
| | |
|---|---|
| *G06N 3/08* | (2006.01) |
| *G10L 17/04* | (2013.01) |
| *G10L 17/00* | (2013.01) |
| *G10L 17/18* | (2013.01) |
| G10L 15/02 | (2006.01) |

(52) U.S. Cl.
CPC ............ *G06N 3/084* (2013.01); *G10L 17/005* (2013.01); *G10L 17/04* (2013.01); *G10L 17/18* (2013.01); *G10L 15/02* (2013.01)

(58) Field of Classification Search
CPC ....... G10L 3/084; G10L 17/005; G10L 17/04; G10L 15/02
USPC ....................... 704/232, 234
See application file for complete search history.

(56) References Cited

U.S. PATENT DOCUMENTS

| | | | | |
|---|---|---|---|---|
| 8,160,877 | B1* | 4/2012 | Nucci | G10L 17/06 704/246 |
| 8,346,554 | B2* | 1/2013 | Zlokarnik | G10L 15/20 381/94.1 |
| 9,401,148 | B2* | 7/2016 | Lei | G10L 17/18 |
| 9,786,270 | B2* | 10/2017 | Senior | G10L 15/063 |
| 2004/0260550 | A1* | 12/2004 | Burges | G10L 17/00 704/259 |
| 2008/0281590 | A1* | 11/2008 | Breebaart | G10H 1/0008 704/231 |

(Continued)

OTHER PUBLICATIONS

Ajmera, Jitendra et al., "*Robust Speaker Change Detection*", IEEE Signal Processing Letters, vol. 11, No. 8, Aug. 2004, pp. 649-651.

(Continued)

*Primary Examiner* — Jakieda R Jackson (57) ABSTRACT

A method for training a neural network of a neural network based speaker classifier for use in speaker change detection. The method comprises: a) preprocessing input speech data; b) extracting a plurality of feature frames from the preprocessed input speech data; c) normalizing the extracted feature frames of each speaker within the preprocessed input speech data with each speaker's mean and variance; d) concatenating the normalized feature frames to form overlapped longer frames having a frame length and a hop size; e) inputting the overlapped longer frames to the neural network based speaker classifier; and f) training the neural network through forward-backward propagation.

8 Claims, 5 Drawing Sheets

(56) References Cited

U.S. PATENT DOCUMENTS

| | | | | |
|---|---|---|---|---|
| 2010/0004926 | A1* | 1/2010 | Neoran | G10L 25/48 704/201 |
| 2013/0297299 | A1* | 11/2013 | Chakrabartty | G10L 15/02 704/211 |
| 2015/0154002 | A1* | 6/2015 | Weinstein | G06F 3/167 715/728 |
| 2017/0061966 | A1* | 3/2017 | Marcheret | G10L 15/25 |

OTHER PUBLICATIONS

Anguera Miro, Xavier et al., "*Speaker Diarization: A Review of Recent Research*", IEEE Transactions on Audio, Speech, and Language Processing, vol. 20, No. 2, Feb. 2012, pp. 356-370.

Bigot, Benjamin et al., "*Exploiting speaker segmentations for automatic role detection. An application to broadcast news documents.*", IEEE, International Workshop on Content Based Multimedia Indexing (CBMI), 2010, 6 pages.

Ellis, Dan, "*PLP and RASTA (and MFCC, and inversion) in Matlab using melfcc.m and invmelfcc.m*", Online Web Resource (https://www.ee.columbia.edu/~dpwe/resources/matlab/rastamat/), 2005, accessed on Apr. 5, 2018 using Internet Archive: Wayback Machine capture dated Aug. 27, 2005, 3 pages.

Ellis, Dan, "*PLP and RASTA (and MFCC, and inversion) in Matlab using melfcc.m and invmelfcc.m*", Online Web Resource (https://www.ee.columbia.edu/~dpwe/resources/matlab/rastamat/), 2015, accessed on Apr. 9, 2018 using Internet Archive: Wayback Machine capture dated Dec. 26, 2015, 3 pages.

Giannakopoulos, Theodoros, "*A method for silence removal and segmentation of speech signals, implemented in Matlab*", University of Athens, Athens, 2009, 3 pages (citation page added).

Kotti, Margarita et al., "*Automatic Speaker Segmentation Using Multiple Features and Distance Measures: A Comparison of Three Approaches*", IEEE International Conference on Multimedia and Expo (ICME), 2006, pp. 1101-1104.

Lu, Lie et al., "*Speaker Change Detection and Tracking in Real-Time News Broadcasting Analysis*", Proceedings of the tenth ACM international conference on Multimedia, Dec. 1-6, 2002, 9 pages.

Ng, Andrew, "*Programming Exercise 4: Neural Networks Learning*" Lecture Week 5 and Lab 4 from Coursera Course: Machine Learning (https://www.coursera.org/learn/machine-learning), accessed Jul. 21, 2016, 15 pages.

Nielsen, Thor Bundgaard, "*Efficient Recursive Speaker Segmentation for Unsupervised Audio Editing*", Technical University of Denmark, Department of Applied Mathematics and Computer Science / DTU Co, 2013, 227 pages (Uploaded in 2 Parts).

Rasmussen, Carl Edward et al., "*Gaussian Processes for Machine Learning*", The MIT Press, 2006, 266 pages (Uploaded in 3 Parts).

Rougui, J.E. et al., "*Fast Incremental Clustering of Gaussian Mixture Speaker Models for Scaling Up Retrieval in On-Line Broadcast*", IEEE International Conference on Acoustics Speech and Signal Processing Proceedings (ICASSP), 2006, pp. V521-V524.

Srihari, Sargur, "*Neural Network Training*", Lecture 5.3 from University of Buffalo Course: Machine Learning and Probabilistic Graphical Models, (http://www.cedar.buffalo.edu/~srihari/CSE574/), Updated Fall 2015 and accessed Apr. 9, 2018 using Internet Archive: Wayback Machine capture dated Aug. 3, 2016, 28 pages.

Wooters, Chuck et al., "*The ICSI RT07s Speaker Diarization System*", R. Stiefelhagen at al. (Eds.) Multimodal Technologies for Perception of Humans. Lecture Notes in Computer Science, vol. 4625, Springer, Berlin, Heidelberg, 2008, pp. 509-519.

* cited by examiner

SYSTEM AND METHOD FOR SPEAKER CHANGE DETECTION

CROSS-REFERENCE TO RELATED APPLICATIONS

This application claims priority benefit of U.S. provisional patent application Ser. No. 62/372,057, entitled SYSTEM AND METHOD FOR SPEAKER CHANGE DETECTION, filed on Aug. 8, 2016, which application is hereby incorporated by reference in its entirety.

TECHNICAL FIELD OF THE DISCLOSURE

The presently disclosed embodiments generally relate to systems and methods for speech detection and, more particularly, to systems and methods for speaker change detection.

BACKGROUND

Speaker Change Detection (SCD) is a task to detect in an audio stream the change of speakers during conversations. An efficient and accurate speaker change detector can be used to partition conversations into homogeneous segments, where only one speaker is present in each segment. Speaker recognition or verification can then be performed on the clustered speaker segments, rather than on a frame-by-frame basis, to improve accuracy and reduce cost. However, SCD is challenging when the system has no prior information regarding the speakers, and it is usually required to detect speaker change in real-time, within a predetermined limit delay, e.g. within 1 or 2 seconds of speech.

SCD can be divided into retrospective vs. real-time detection. Retrospective detection is normally based on model training for speakers and a detection algorithm, using Gaussian Mixture Models (GMMs) and Hidden Markov Models (HMMs), etc. It includes approaches with different thresholding criteria, such as Bayesian Information Criterion (BIC), Kullback-Leibler (KL)-based metrics, etc. In the case of real-time detection, the speaker change decision has to be made using limited preceding data with low computational cost. Research has been focused on improving features and developing efficient distance metrics. Lu et al. (Lie Lu and Hong-Jiang Zhang, "Speaker change detection and tracking in real-time news broadcasting analysis," in Proceedings of the tenth ACM international conference on Multimedia. ACM, 2002, pp. 602-610) obtained reliable change detection in real-time news broadcasting with the Bayesian feature fusion method. In the evaluation using TIMIT synthesized data by Kotti et al. (Margarita Kotti, Luis Gustavo P M Martins, Emmanouil Benetos, Jaime S Cardoso, and Constantine Kotropoulos, "Automatic speaker segmentation using multiple features and distance measures: A comparison of three approaches," in IEEE ICME' 06), the mean F1 score was 0.72 and it observed a significant drop in accuracy for speaker change with durations less than 2 seconds. Another work from Ajmera et al. (Jitendra Ajmera, Iain McCowan, and Herve Bourlard, "Robust speaker'change detection," IEEE signal processing letters, 2004) reported 81% recall and 22% precision using BIC and log-likelihood ratios on HUB-4-1997 3-hour news data.

There therefore remains a need for improved systems and methods that can detect speaker change in an audio stream using limited preceding data with low computational cost.

SUMMARY OF THE DISCLOSED EMBODIMENTS

A method for training a neural network of a neural network based speaker classifier for use in speaker change detection. The method comprises: a) preprocessing input speech data; b) extracting a plurality of feature frames from the preprocessed input speech data; c) normalizing the extracted feature frames of each speaker within the preprocessed input speech data with each speaker's mean and variance; d) concatenating the normalized feature frames to form overlapped longer frames having a frame length and a hop size; e) inputting the overlapped longer frames to the neural network based speaker classifier; and f) training the neural network through forward-backward propagation.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
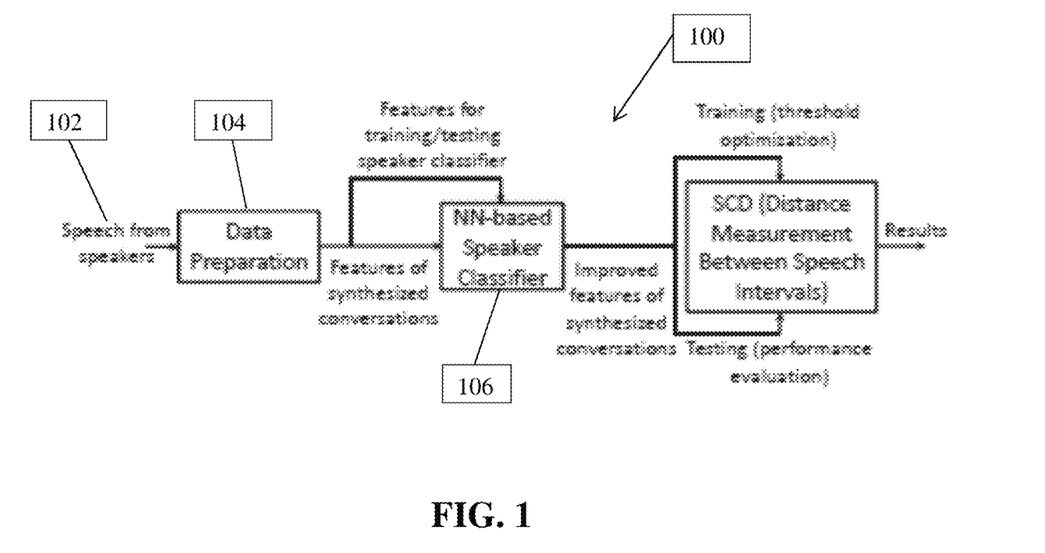
FIG. 1 illustrates a schematic diagram of a system for using improved features through a neural network based speaker classifier for Speaker Change Detection (SCD) according to an embodiment.

FIG. 1 illustrates a schematic diagram of a system, indicated generally at 100 for using a neural network (NN) based speaker classifier as a feature transformer for creating improved features and then detecting speaker changes with the improved features for Speaker Change Detection (SCD) according to an embodiment.

a. Data Preparation

The system 100 analyzes speech data 102 from speakers in order to detect speaker changes. The speech data 102 is first prepared at block 104. In one embodiment, speech data 102 was obtained from the TIMIT corpus, which is a corpus of phonemically and lexically transcribed speech of American English speakers of different sexes and dialects published by the National Institute of Standards and Technology (NIST). Speech of all 326 male speakers in the "train" folder of the TIMIT corpus was used in the embodiments described herein. Data of males from the "test" folder and data of females from both "train" and "test" folders were not used. For each speaker, there were 10 data files containing one sentence each from 3 categories: "SX" (5 sentences), "SI" (3 sentences) and "SA" (2 sentences). The 326 male speakers were sorted alphabetically and divided into 2 groups: first 200 speakers (group A) and remaining 126 speakers (group B). For group A, sentences in the "SX" and "SI" categories were different among speakers. They were combined with a total duration around 20 seconds per speaker and used to train the text-independent neural network speaker classifier 106. Sentences in the "SA" category were the same and shared with all speakers, so that they can be used to test the accuracy with no distinguishable information added through content. For group B, synthesized conversations were generated by concatenating speech from multiple speakers. Conversations created using "SX" and "SI" sentences of the first 63 out of 126 speakers were used to find the optimal threshold to determine speaker change, while conversations with "SX" and "SI" sentences of the remaining 63 speakers were used for testing the SCD performance.

The raw speech 102 is converted into features used in the development of the speaker classifier and SCD algorithm, including a) preprocessing, and b) feature extraction, normalization and concatenation.

A. Preprocessing

Preprocessing in some embodiments comprises a) scaling the maximum of absolute amplitude of the input speech 102 to 1, and b) using Voice Activity Detection (VAD) to eliminate the unvoiced part of speech 102. Experiments show both speaker classification and speaker change detection can perform significantly better if speakers are evaluated using only voiced speech, especially when the data is noisy.

An improved version of Giannakopoulos's method (Theodoros Giannakopoulos, "A method for silence removal and segmentation of speech signals, implemented in Matlab," University of Athens, Athens, 2009) with short-term energy and spectral centroid is developed for VAD. Given a short-term signal s(n) with N samples, the energy of the speech signal 102 is:

$$E = \frac{1}{N}\sum_{n=1}^{N} |s(n)|^2,$$

and given the corresponding Discrete Fourier Transform (DFT) S(k) of s(n) with K frequency components, the spectral centroid of the speech signal 102 can be formulated as:

$$C = \frac{\sum_{k=1}^{K} kS(k)}{\sum_{k=1}^{K} S(k)}.$$

The short-term energy E is used to discriminate silence with environmental noise, and the spectral centroid C can be used to remove non-environmental noise, i.e. non-speech sound, such as coughing, mouse clicking and keyboard tapping, since they normally have different spectral centroids compared to human speech. Only when E and C are both above predetermined thresholds TE and TC is the speech frame considered to be voiced. Otherwise, the speech frame will be removed. The predetermined thresholds TE and TC may be adjusted to be slightly higher to enforce a stricter VAD algorithm and ensure the quality of the captured voiced sections of the speech 102. This is achieved by tuning the signal median smoothing parameters, such as step size and smoothing order, as well as setting the thresholds TE and TC as a weighted average of the local maxima in the distribution histograms of the short-term energy E and spectral centroid C, respectively. In one embodiment, the TIMIT speech 102 with the original 16K sampling rate was segmented into overlapped frames with a 50 ms window size and a 25 ms hop size.

B. Feature Extraction, Normalization and Concatenation

Figure 2:
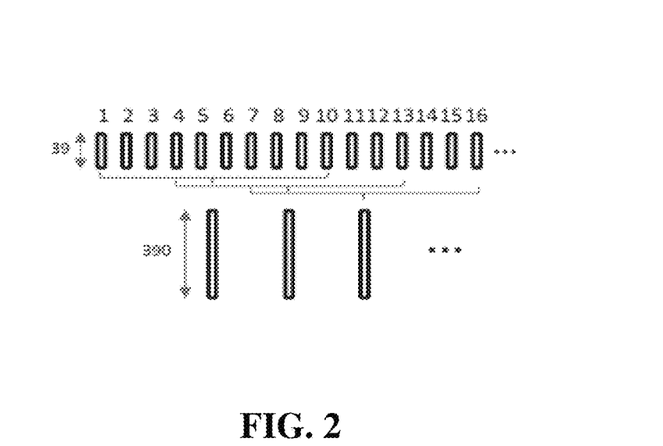
FIG. 2 is a schematic illustration of feature extraction, normalization and concatenation according to one embodiment.

The 39-dimensional Mel-Frequency Cepstral Coefficients (MFCCs) with delta and double delta were generated from the preprocessed speech, using Ellis's methodology (Daniel P. W. Ellis, "PLP and RASTA (and MFCC, and inversion) in Matlab," 2005, online resource). The MFCCs were extracted using overlapped 25 ms Hamming windows which hop every 10 ms. Then, the features of each speaker were normalized with his own mean and variance. To capture the transition patterns within longer durations, these 39-dimensional feature frames were concatenated to form overlapped longer frames. In one embodiment, 10 frames (100 ms) were concatenated with a hop size of 3 frames (30 ms) as shown in FIG. 2.

II. Neural Network Speaker Classification

The concatenated features (e.g. 390 dimensional feature vectors in one embodiment) were used as the input to the neural network based speaker classifier 106. As previously mentioned, the "SX" and "SI" sentences of the first 200 male speakers were used for training the neural network based speaker classifier 106, and the remaining "SA" sentences from the same set of speakers were used for testing.

A. Cost Function and Model Structures

Ng's neural network training methodology for handwritten digit classification (Andrew Ng, "Neural networks: learning (lecture week 5 and lab 4), from coursera course: Machine learning," https://www.coursera.org/learn/machine-learning/home/info, Accessed: 2016 Jul. 21) was used in this embodiment, which treats the multi-class problem as K separate binary classifications. It is considered to be the generalization of the cost function of binary classification using logistic regression, which is built on slightly different concepts compared with the cross-entropy cost function with softmax as the output layer (Sargur Srihari, "Neural network training (lecture 5.3), from university of buffalo course: Machine learning and probabilistic graphical models," http://www.cedar.buffalo.edu/~srihari/CSE574/, Accessed: 2016 Jul. 21).

Given M samples, K output classes, and L layers, including input, output and all hidden layers in between, the cost function can be formulated as:

$$J(\Theta) = -\frac{1}{M}\left[\sum_{m=1}^{M}\sum_{k=1}^{K}(y_k^{(m)}\log(h_\theta(x^{(m)})k) + (1-y_k^{(m)})\log(1-h_\theta(x^{(m)})k))\right] + \frac{\lambda}{2M}\sum_{l=1}^{L-1}\sum_{i=1}^{s_l}\sum_{j=1}^{s_{l+1}}(\theta_{ji}^{(l)})^2$$

where $h\theta(x^{(m)})_k$ is the kth output of the final layer, given mth input sample x (m), and $y^{(m)}_k$ is its corresponding target label. The 2nd half of the above equation is the regularization factor to prevent over-fitting, where λ is the regularization parameter and $\theta^{(l)}_{ji}$ is the j-th row, i-th column element of the weight matrix $\theta^{(l)}$ between l-th and (l+1)-th layers, i.e. the weight from i-th node in l-th layer to j-th node in (l+1)-th layer.

In this embodiment, there is only 1 hidden layer (L=3) with 200 nodes ($s_2$=200), the input feature dimension is 390 ($s_1$=390), and the neural network based speaker classifier 106 was trained with data from 200 speakers ($s_3$=K=200). Therefore, the network structure is 390:200:200, with weight matrices $\Theta^{(1)}$(200×391) and $\Theta^2$ (200×201). The additional 1 column is a bias vector, which is left out in regularization, since the change of bias is unrelated to over-fitting. In this embodiment, the regularization part in the above equation can be instantiated as:

$$\sum_{l=1}^{L-1}\sum_{i=1}^{s_l}\sum_{j=1}^{s_{l+1}}(\theta_{ji}^{(l)})^2 = \sum_{i=1}^{390}\sum_{j=1}^{200}(\theta_{j,i}^{(1)})^2 + \sum_{i=1}^{200}\sum_{j=1}^{200}(\theta_{j,i}^{(2)})^2.$$

B. Model Training and Performance Evaluation

The neural network model of the neural network based speaker classifier 106 is trained through forward-backward propagation. Denoting $z^{(l)}$ and $a^{(l)}$ as the input and output of the l-th layer, the sigmoid function $$a^{(l)} = g(z^{(l)}) = \frac{1}{1+e^{-z^{(l)}}}$$

may be selected as the activation function, and the input $z^{(l+1)}$ of the (l+1)-th layer can be transformed from the output $a^{(l)}$ of the l-th layer, using $z^{(l+1)}=\Theta a^{(l)}$. Then, $h\theta(x)$ can be computed through forward propagation: $x=a^{(1)}\rightarrow z^{(2)}\rightarrow a^{(2)}\rightarrow \ldots \rightarrow z^{(L)}\rightarrow a^{(L)}=h\theta(x)$. The weight matrix $\Theta^{(l)}$ is randomly initiated using continuous uniform distribution between (−0.1, 0.1) and then trained through backward propagation of $\partial J/\partial\theta^{(l)}_{j,i}$, by minimizing J(Θ) using Rasmussen's conjugate gradient algorithm, which handles step size (learning rate) automatically with a slope ratio method (Carl Edward Rasmussen, "Gaussian processes for machine learning," 2006).

In evaluating the performance of the neural network based speaker classifier 106, the sigmoid output of the final layer $h\theta(x^{(m)})$ is a K-dimensional vector, with each element in the ranges of (0, 1). It serves as the "likelihood" to indicate how likely it is to classify the m-th input frame into one of the K speakers. The speaker classification can be predicted by the sum of log likelihood of M input frames (prediction scores), and the predicted speaker ID k* is the index of its maximum:

$$k^* = \arg\max_{k\in[1,K]}\left(\sum_{m=1}^{M}\log(h_\theta(x^{(m)}))\right).$$

Figure 3A:
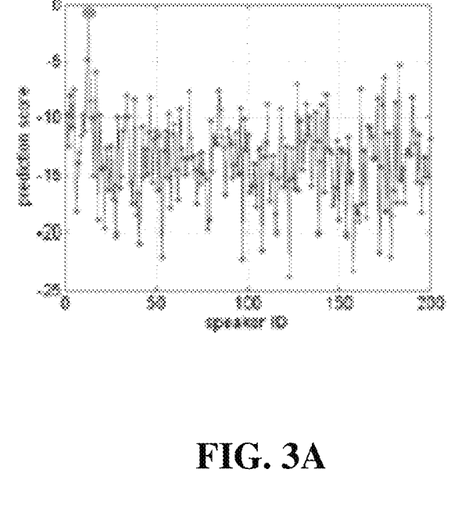
FIG. 3A is a chart file-level prediction scores of 13th speaker (MPGR0) in a training set according to one embodiment.
Figure 3B:
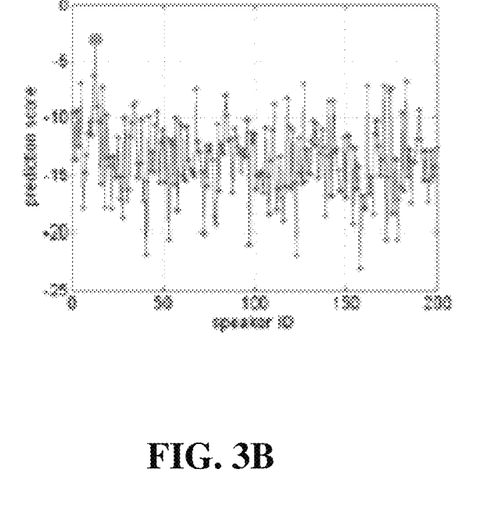
FIG. 3B is a chart file-level prediction scores of 13th speaker (MPGR0) in a testing set according to one embodiment.

M can range from 1 to the entire frame length of the testing file. If M=1, the accuracy achieved is based on individual frames, each of which is 100 ms (window duration Twin in feature concatenation) with 30 ms of new data, compared with the previous frame, in this embodiment. On the other hand, if M is equal to the total number of frames in file, the accuracy is file-based. The average duration of sentences (i.e., file length) is about 2.5 seconds in this embodiment. In general, larger values of M lead to higher accuracy. Given the best model available with the network structure 390: 200:200, FIGS. 3A-B demonstrate an example of file-level prediction score of 13-th speaker (MPGR0). It shows the peak of positives (in the green circle) is slightly dropped but still distinguishable enough to all other negatives, from the file SI1410 in the training set (FIG. 3A), to the file SA1 in the testing set (FIG. 3B).

Using this model, the file-based training and testing accuracies at 200 speaker size are both 100%, as indicated in Table 1. The frame-based testing accuracy indicates 63.86% of frames in the testing set can be classified correctly, with duration as little as 0.1 second. It also shows the min/mean/max number of consecutive frames needed and their corresponding durations in order to achieve 100% accuracy. Since the next frame provides only 30 ms (hop duration $T_{hop}$ in feature concatenation) additional information, compared with the current

TABLE 1

NN-based speaker classification performance with first 200 male in TIMIT (0.1 sec./frame, ~2.5 sec./file)

| | accuracy (%) | | frame (sec.) needed to get 100% accuracy | | |
|---|---|---|---|---|---|
| dataset | frame-based | file-based | min | mean | max |
| train | 90.5 | 100 | 2 (0.13) | 3.49 (0.18) | 6 (0.25) |
| test | 63.86 | 100 | 5 (0.22) | 13.77 (0.48) | 47 (1.48) | frame, given the number of frames needed N, the formula to compute the corresponding required duration T is $$T=(N-1)\times T_{hop}+1\times T_{min}.$$

With this formula, it requires only 13.77 frames (0.48 second) on average, to achieve 100% accuracy in the testing dataset.

Although using the training data to test the system 100 is normally not considered legitimate, it is used in this embodiment merely to get a sense of how the accuracy drops when switching from training data to testing data.

C. Model Parameter Optimization

The neural network model of the present embodiment with the structure 390:200:200 is actually the best one in terms of highest frame-level testing accuracy, after grid searching on a) the number of hidden layers (1, 2), and b) the number of nodes per hidden layer (50, 100, 200, 400), with a subset containing only 10% randomly selected training and testing data.

Once the ideal network structure is identified, the model training is conducted with a regularization parameter λ in the cost function J(Θ), which is iteratively reduced from 3 to 0 through training. This dynamic regularization scheme is experimentally proved to avoid over-fitting and allow more iterations to reach a refined model with better performance.

In some embodiments, the training is set to be terminate once the testing frame accuracy cannot be improved more than 0.1% in the last 2 consecutive training iterations, which normally takes around 500 to 1000 iterations. The training set in the present embodiment is at 200 speaker size with 20 seconds speech each. It was fed in as a whole batch of data, which required about 1 hour to train, on a computer with i7-3770 CPU and 16 GB memory. Therefore, the computational cost is certainly manageable.

III. Speaker Change Detection Using Speaker Classification Outputs

In some embodiments, the system 100 is used to detect the speaker change in conversations. Developing an NN-based speaker classifier 106 is among one of the approaches to improve features for that purpose. Here given the raw feature $x \in \mathbb{R}^{390}$, the transformed new feature is denoted as $$d = \log(h_\Theta(x)) \in \mathbb{R}^{200}.$$

Dividing the conversation into consecutive speech intervals with equal frame length M, the goal is to develop some distance metrics to measure the difference between 2 sets of improved features at current interval t and previous interval t−1, which is formulated as:

$$d'_t = \text{dist}(d_t, d_{t-1})$$

Figure 4A:
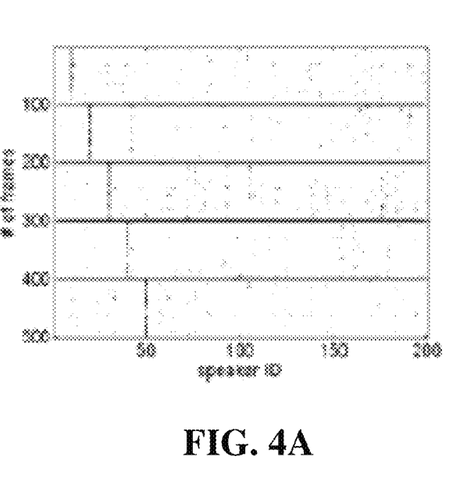
FIG. 4A is a chart illustrating prediction scores produced from concatenation of 100 200-dimensional transformed features for 5 in-domain speakers according to an embodiment.
Figure 4B:
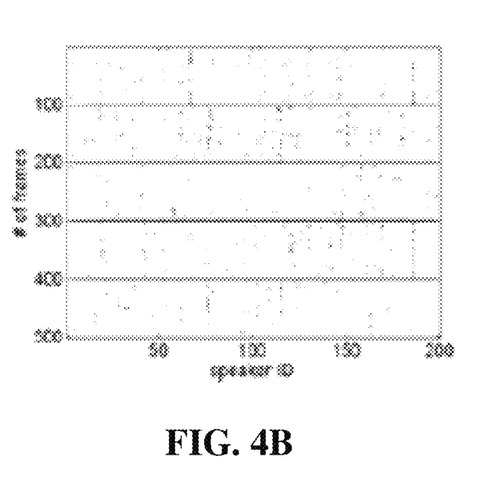
FIG. 4B is a chart illustrating prediction scores produced from concatenation of 100 200-dimensional transformed features for 5 out-of-domain speakers according to an embodiment.

FIGS. 4A-B show an example of concatenation of 100 200-dimensional transformed features for 5 in-domain (FIG. 4A) and 5 out-of-domain (FIG. 4B) speakers. These features are reversed to linear scale (i.e. $h_\Theta(x)$) rather than logarithmic scale for better visibility and are from the testing set containing "SA" sentences. The in-domain speakers are with speaker ID: 10, 20, 30, 40 and 50 (selected from first 200 speakers), while the IDs for the out-of-domain ones are: 210, 220, 230, 240 and 250 (selected from speakers with ID 201 to 326). The prediction scores are shown in gray scale, the larger the darker. The pattern for each speaker in (a) is fairly clear since they peak at their own ID indices. The pattern for speakers in (b) is not apparent, but one can still find some "strip lines", which indicate the consistency in similarity comparing one out-of-domain speaker with all in-domain speakers.

A. Distance Metrics to Compare Adjacent Intervals

Figure 5:
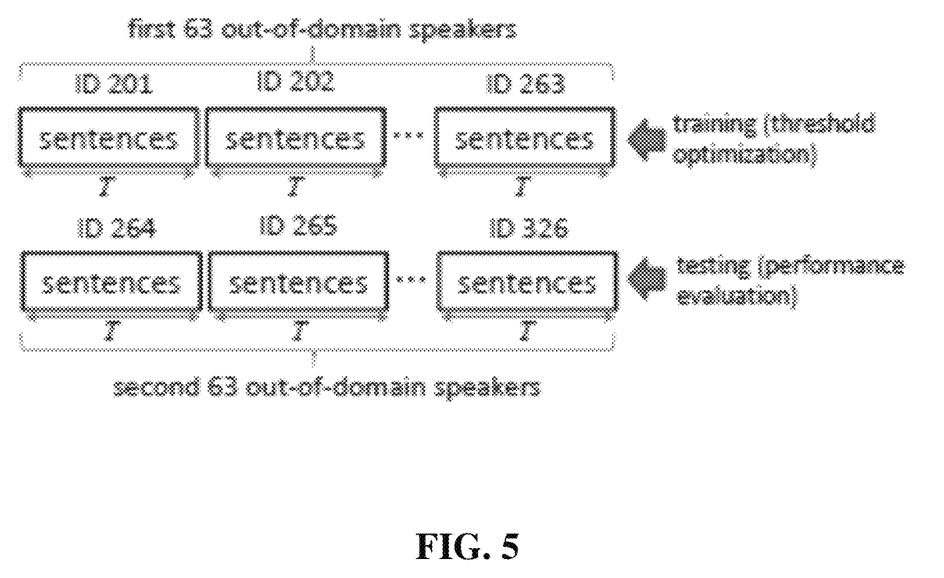
FIG. 5 is a schematic diagram illustrating speech concatenation to form synthesized conversations for training and testing in speaker change detection according to an embodiment.

With the "SX" and "SI" sentences in the remaining 126 out-of-domain male speakers, 2 concatenated speeches were created using the data from the first 63 and the remaining 63 speakers, respectively. They were used for training (threshold determination) and testing (performance evaluation) respectively in the system 100. Sentences for the same speaker were first concatenated with the speech in the first T seconds. T is the duration for the shortest concatenation among all 126 speakers (T=14 seconds in this embodiment). These sentences grouped by speakers are then concatenated again to form the synthesized training and testing conversations (14×63=882 seconds≈15 minutes each), as shown in FIG. 5.

The concatenated speech is then examined in each adjacent but non-overlapped interval t with M frames. Using p-norm distance metrics:

$$d'_t = \left( \sum_{k=1}^{K} (|\bar{d}_t - \bar{d}_{t-1}|^p) \right)^{\frac{1}{p}},$$

where K is the number of in-domain speakers used to train the neural network based speaker classifier 106 (i.e., the dimension of the transformed features $d_t$ and $d_t-1$ both are feature matrices at size of M×K, and $\bar{d}_t$, $\bar{d}_t-1$ are their mean vectors with dimension K). The difference between current and previous intervals $d_t$ should be low (as negative), if feature matrices $d_t$ and $d_t-1$ belong to the same speaker, and should be high (as positive), if feature matrices $d_t$ and $d_t-1$ belong to different speakers. In this embodiment, p={⅛, ¼, ½, 1, 2, 4, 8, ∞} are tested, and p=2, i.e. the Euclidean distance provided the best separation between positive (higher value expected) and negative (lower value expected) samples.

Some other distance metrics other than p-norm, such as Bhattacharyya distance for comparison between 2 sets of samples, is also evaluated here. However, since the major difference between $\bar{d}_t$ and $\bar{d}_t-1$ demonstrated only with a few dimensions, which is much smaller than the full dimension K, the covariance matrices for both $\bar{d}_t$ and $\bar{d}_t-1$ are not positive definite, and this type of distance is not feasible.

B. SCD Training and Testing

Figure 6A:
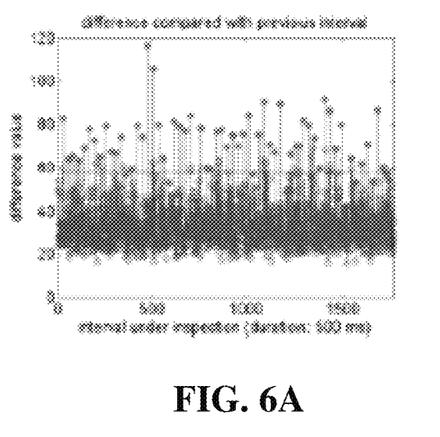
FIG. 6A is a chart illustrating experimental distributions of positive and negative samples with 0.5 second interval duration according to an embodiment.
Figure 6B:
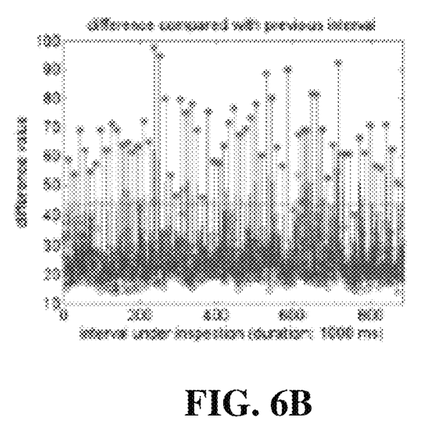
FIG. 6B is a chart illustrating experimental distributions of positive and negative samples with 1.0 second interval duration according to an embodiment.
Figure 6C:
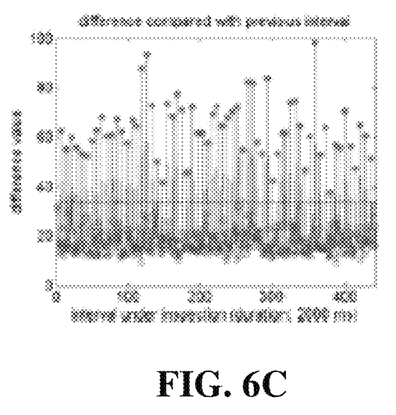
FIG. 6C is a chart illustrating experimental distributions of positive and negative samples with 2.0 seconds interval duration according to an embodiment.

Denoting the difference $d'_t$ between current and previous intervals t, t−1 as sample x, the speaker changes can be detected if x is higher than an optimal threshold x*. FIGS. 6A-C plot experimental data of $d'_t$ vs. interval t with interval durations 0.5, 1, and 2 seconds, where positive samples are highlighted with red stars. They are evenly distributed since the conversation speech is concatenated using speeches from individual speakers with the same duration. By modeling the positive and negative samples as two Gaussian distributions, the Bayesian decision boundary is selected as the optimal threshold x*.

Figure 6D:
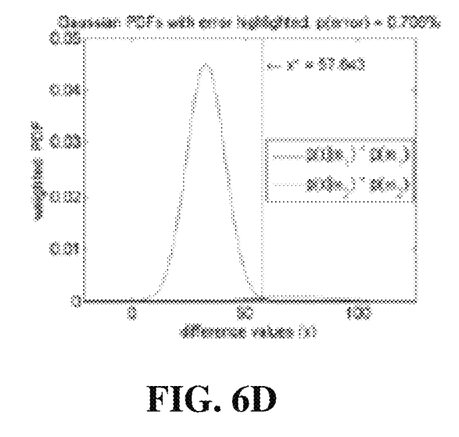
FIG. 6D is a chart illustrating theoretical distributions of positive and negative samples with 0.5 second interval duration according to an embodiment.
Figure 6E:
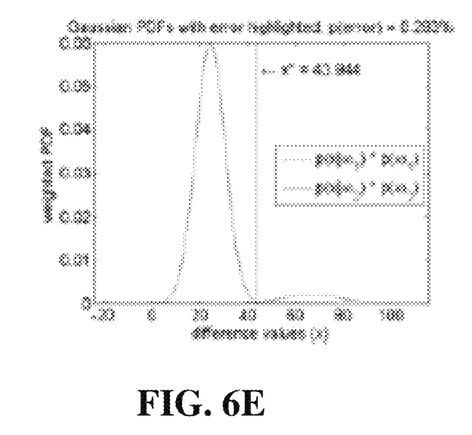
FIG. 6E is a chart illustrating theoretical distributions of positive and negative samples with 1.0 second interval duration according to an embodiment.
Figure 6F:
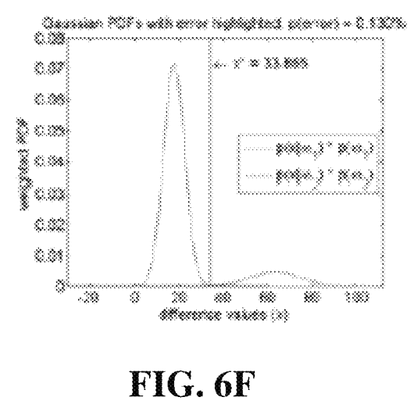
FIG. 6F is a chart illustrating theoretical distributions of positive and negative samples with 2.0 seconds interval duration according to an embodiment.

As is shown in FIGS. 6D-F, the negative samples (class label ω1 in FIG. 6) are much more than positive samples (class label ω2 in FIG. 6), especially when the time interval is small. Therefore, the dataset is very skewed. Therefore, F1 score is used along with error rate $P_e$ to measure the SCD performance. Given False Negative Ratio (FNR) (i.e., the ratio of classifying positive as negative (F N) vs. all positive (P)), False Positive Ratio (FPR) (i.e., the ratio of classifying negative as positive (F P) vs. all negative (N)), and P=T P+F N and N=T N+F P, $P_e$ and F1 can be computed by:

$$P_e = \frac{FN + FP}{P + N}$$

$$F1 = \frac{2TP}{2TP + FP + FN}$$

Table 2 shows all of these statistics for performance evaluation.

TABLE 2

Speaker change detection performance on synthesized conversations (theoretical on the training set, experimental on the testing set), with multiple inspection interval.

| itv1./ spkr. | itv1. sec. | $P_e$ (%) | F1 | FNR (%) | FPR (%) | $P_e$ (%) | F1 | FNR (%) | FPR (%) |
|---|---|---|---|---|---|---|---|---|---|
| | | | | (theoretical) | | | | (experimental) | |
| 28 | 0.5 | 0.71 | 0.894 | 14.45 | 0.17 | 2.27 | 0.718 | 17.74 | 1.70 |
| 14 | 1 | 0.28 | 0.980 | 3.02 | 0.08 | 1.59 | 0.896 | 3.23 | 1.47 |
| 7 | 2 | 0.13 | 0.995 | 0.71 | 0.03 | 0.68 | 0.976 | 0 | 0.79 |

The results for training data are theoretical, computed using Gaussian distributions in FIGS. 6D-F, and the ones for testing data are experimentally counted, using plots similar to FIGS. 6A-C. However, the optimal thresholds for the training data may still not be optimal for the testing data. It shows around 3% of speaker changes cannot be detected by comparing features in the current second and the previous second. However, this number can drop significantly once the inspection interval is longer than 1 second.

C. Potential Further Improvement

The approach described above for SCD is checking the difference $d'_t$ between $d_t$ and $d_t-1$, features in the current and previous intervals. However, by comparing current difference $d'_t$ with the previous difference $d'_t-1$ and the next difference $d'_t+1$ (i.e., difference of the difference), may reveal more reliable information. This is based on the assumption that if speaker change occurs in the current interval, the $d'_t$ will be much higher than both its previous and next ones, $d'_t-1$ and $d'_t+1$. This distance metric can be considered as "second derivative" of the raw feature, and is formulated as:

$$d''_t = (d'_t - d'_{t-1}) + (d'_t - d'_{t+1})$$

It shows accuracy improvement in some noisy cases, such as reducing the error rate on the testing data from 2.27% to 1.25%, with a 0.5 second interval. However, it will delay the decision for 1 additional time interval, since it requires the next feature $d_t+1$ in computation.

In the present embodiments, a SCD approach using improved features through a speaker classification network is presented. The features are represented by vectors of attributes of the in-domain speakers, i.e. projected onto a space spanned by the in-domain speakers. It enables the use of simple distance metrics such as Euclidean distance between the feature centroids to detect speaker change in adjacent intervals. Using TIMIT data of 200 male speakers, the classifier guarantees to achieve 100% accuracy with speech no longer than 1.5 seconds. With improved features of synthesized conversations of 60+ speakers, only around 3% of the changes are mis-detected with the F1 score close to 0.9 on the testing set.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A method for training a neural network of a neural network based speaker classifier for use in speaker change detection, the method comprising:
    a) preprocessing input speech data;
    b) extracting a plurality of feature frames from the preprocessed input speech data;
    c) normalizing the extracted feature frames of each speaker within the preprocessed input speech data with each speaker's mean and variance;
    d) concatenating the normalized feature frames to form overlapped longer frames having a frame length and a hop size;
    e) inputting the overlapped longer frames to the neural network based speaker classifier; and
    f) training the neural network through forward-backward propagation, wherein step (a) comprises:
        a.1) scaling a maximum of absolute amplitude of the input speech data to one;
        a.2) performing voice activity detection on the scaled input speech data; and
        a.3) eliminating unvoiced portions of the scaled input speech data, and
    wherein step (a.2) comprises:
        a.2.1) segmenting the scaled input speech data into overlapped frames with a window size and a hop size;
        a.2.2) determine a short-term energy E of each frame;
        a.2.3) determine a spectral centroid C of each frame;
        a.2.4) remove any frame from the scaled input speech data in which the short-term energy E of the frame is below a predetermined threshold TE; and
        a.2.5) remove any frame from the scaled input speech data in which the spectral centroid C of the frame is below a predetermined threshold TC.

2. The method of claim 1, wherein the window size of the overlapped frames is 50 ms and the hop size of the overlapped frames is 25 ms.

3. The method of claim 1, wherein the short-term energy E comprises:

$$E = \frac{1}{N} \sum_{n=1}^{N} |s(n)|^2,$$

where s(n) is the frame data with N samples.

4. The method of claim 1, wherein the spectral centroid C comprises:

$$C = \frac{\sum_{k=1}^{K} kS(k)}{\sum_{k=1}^{K} S(k)},$$

wherein S(k) is a Discrete Fourier Transform (DFT) of frame data s(n) with k frequency components.

5. The method of claim 1, wherein:
the predetermined threshold TE is a weighted average of the local maxima in a distribution histogram of the short-term energy E; and
the predetermined threshold TC is a weighted average of the local maxima in a distribution histogram of the spectral centroid C.

6. The method of claim 1, wherein step (b) comprises generating 39-dimensional Mel-Frequency Cepstral Coefficients (MFCCs) from the preprocessed input speech data using overlapping Hamming windows and a hop size.

7. The method of claim 6, wherein the Hamming window is 25 ms and the hop size of the Hamming windows is 10 ms.

8. The method of claim 1, wherein the overlapped longer frame length is 10 frames and the hop size of the overlapped longer frames is 3 frames.

* * * * *